United States Patent [19]
Peham

[11] 3,929,310
[45] Dec. 30, 1975

[54] BRACKET FOR SUPPORTING AN ORNAMENT

[76] Inventor: Engelbert J. Peham, 1263 Donohue Ave., St. Paul, Minn. 55104

[22] Filed: Oct. 4, 1974

[21] Appl. No.: 512,069

[52] U.S. Cl. ............... 248/226 E; 24/257 R; 248/40
[51] Int. Cl.² .................. B65A 77/10; A01D 57/02
[58] Field of Search ............. 248/226 E, 40, 41, 43; 116/28 R, 30; 161/12; 24/255 BC, 255 SP, 257 R, 73 PF

[56] References Cited
UNITED STATES PATENTS

| | | | |
|---|---|---|---|
| 1,876,351 | 9/1932 | Shirley | 248/43 X |
| 2,329,046 | 9/1943 | Halbig | 116/28 R UX |
| 2,434,360 | 1/1948 | Hess | 248/226 E |
| 2,844,981 | 7/1958 | Steine | 248/41 X |
| 3,036,545 | 5/1962 | Legg | 248/43 X |
| 3,083,773 | 4/1963 | Nagel et al. | 24/257 R X |
| 3,433,203 | 3/1969 | Sharkey et al. | 116/28 R |
| 3,540,406 | 11/1970 | Dexter | 116/28 R |
| 3,613,346 | 10/1971 | Hubbard | 24/257 R X |
| 3,639,952 | 2/1972 | Thompson | 24/255 BC |
| 3,643,902 | 2/1972 | Gualano | 248/40 |

Primary Examiner—J. Franklin Foss

[57] ABSTRACT

A generally J-shaped bracket is designed for attachment to a generally cylindrical object, or to the metal trim above the windsheild of a passenger car. The rounded end of the bracket is preferably grooved to engage the object to which it is attached. The longer end of the bracket supports a rod designed to extend in a generally upright position. The upper end of the rod is designed to support an ornament, such as a miniature hat cast of foam plastic having a downwardly directed socket for receiving the rod.

10 Claims, 12 Drawing Figures

3,929,310

BRACKET FOR SUPPORTING AN ORNAMENT

This invention relates to an improvement in Miniature Hat Supports and deals particularly with a means of holding an object to a vehicle such as an automobile, a bicycle, or a motorcycle.

BACKGROUND OF THE INVENTION

The applicant has for many years produced hats simulating straw skimmer hats made of foam plastic. During recent years, the production of miniature hats has become very popular. Miniature hats of this type are sufficiently inexpensive so that they can be given away at parties and other entertainments and they may be worn as indicated in my U.S. Pat. No. 3,748,680 issued July 31, 1973. It has also been found that hats of this type have become popular as an ornament for cars, motorcycles, bicycles and the like. These hats have also been used to decorate automobile antennas and the like as a means of quickly locating a car in a parking lot. Accordingly, I have made hats in miniature sizes with downwardly extending bosses centrally located so that the hats may be inserted on the top of an antenna or a suitable attachment.

One such hat is illustrated in the drawings, but it should be understood that various types of miniature hats or ornaments could be employed.

SUMMARY OF THE INVENTION

The support is employed to engage the handle bars of a bicycle or a motorcycle, or to engage the metal trim normally used above the windshield of a passenger vehicle. A support may include a space for advertisement or identification and act to support the miniature hat which is usually provided with an encircling band to indicate the origin of the device.

The hat support, usually formed of somewhat resilient plastic, is believed unusual in that it is capable of supporting the hat or other ornament to a device of circular cross section such as the handle bars of a bicycle or motorcycle, and still is capable of fitting the metalic trim above the windshield of an automobile. The device includes a generally J-shaped clamp having transverse serrations or teeth so that the shorter end of the J-shaped member may extend beneath the support, and the longer side may extend above the support. A supporting member or pin is mounted in right angular relation to the upper portion of the resilient clamp. This supporting member may include a flattened area for use in advertising the source of the device. The supporting pin may also include a grooved end portion designed to extend into the socket in the lower portion of the miniature hat or other ornament and to retain the hat in position in spite of the fact that the vehicle is likely to travel at a considerable rate of speed. The grooves in the end of the pin are generally V-shaped in form, the grooves being slanted so that the insertion of the hat onto the supporting pin is relatively simple, but the removal of the hat from the pin is resisted by a series of shoulders which are so constructed that the hat, once inserted, cannot be removed without considerable damage to the socket into which the pin is inserted.

These and other objects and novel features of the present invention, will be more clearly and fully set forth in the following specification and claims.

DESCRIPTION OF THE PREFERRED EMBODIMENTS

Figure 3:
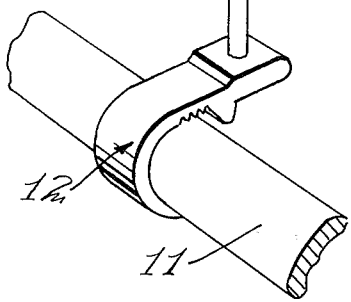
FIG. 3 is a perspective view of the attachment on the handle bar of a bicycle or motorcycle.
Figure 4:
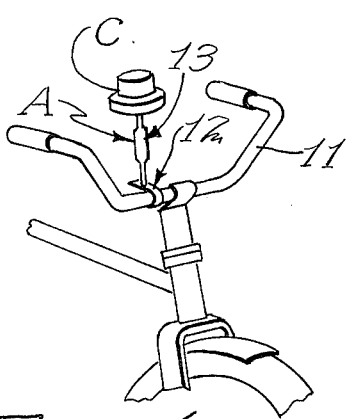
FIG. 4 is a view similar to FIG. 3 but showing the ornament in position on the motorcycle or bicycle.

The ornament support is indicated in general by the letter A and is designed to attach to the molding 10 above the windshield of the automobile B, or the handle bar 11 of a bicycle, as shown in FIGS. 3 and 4 of the drawings. The attachment includes in general, the clip 12, and a pin or supporting post 13 secured to the clip or integral therewith to extend in generally right angles thereto. The clip includes a substantially J-shaped structure including an elongated arm 14 which is connected along a rounded area of connection 15 to a shorter opposed arm 16. A shorter arm 16 is provided with teeth 17 designed to engage the surface to which it is attached. The longer arm 14 also includes teeth 19 which are positioned inwardly of a stop shoulder 20a from which the rod support 13 extends.

The distance between the arms 16 and 14 is preferably shorter than the diameter of the handle bars 11 of a bicycle. The arm 16 is also provided with a pointed end 20 which is designed to extend between the windshield 21 of the vehicle B and the molding 10 defining the upper surface of the windshield.

Figure 1:
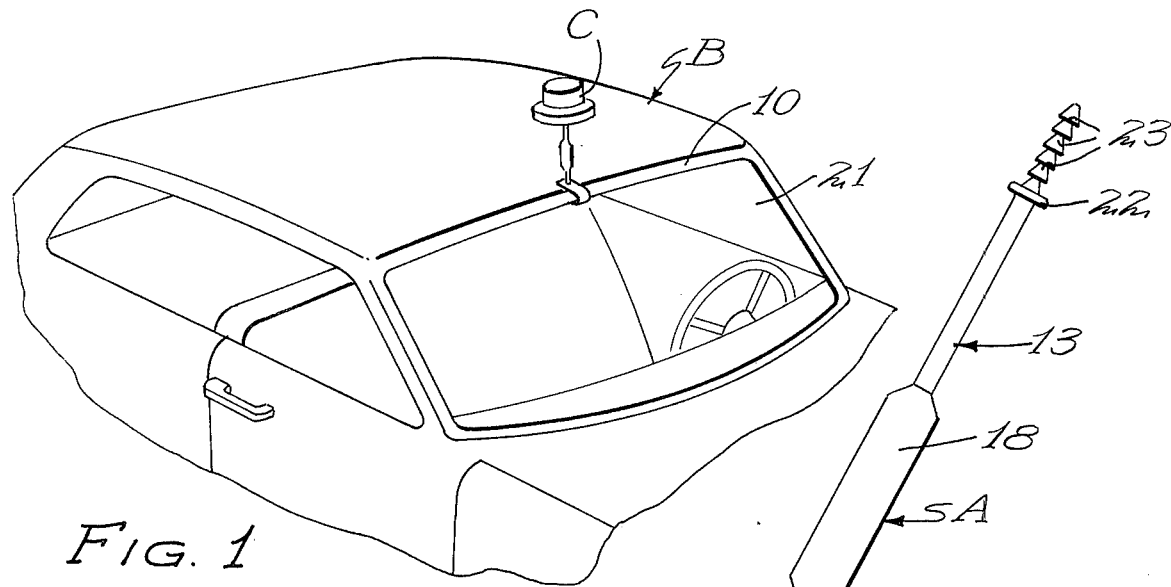
FIG. 1 is a perspective view of an automobile showing the attachment thereto and supporting an ornament.
Figure 2:
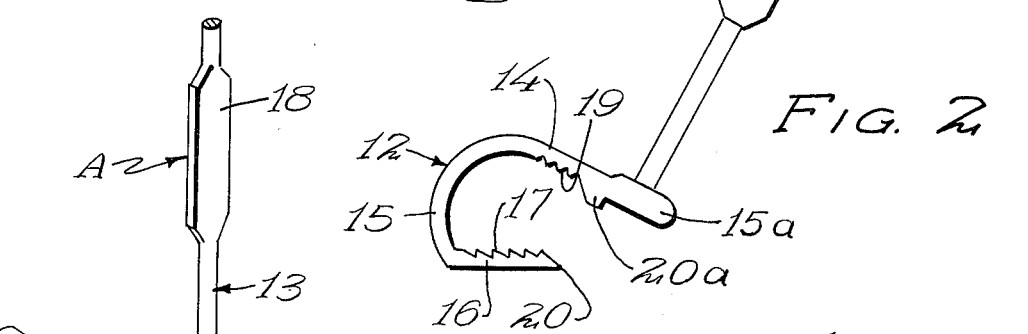
FIG. 2 is a side elevational view of the preferred form of construction of the support.

The rod 13 is inserted into the enlarged end 15a of the clip 12, or is cast integral therewith. A flattened area 18 may be provided on the rod or pin 13, and this flattened area 18 may be used for advertising, or at least for indicating the source of the attachment. The rod 13 is provided with a shoulder 22 spaced from its free end, and the end may be grooved as indicated at 23 to support the ornament 24. In the form illustrated in FIG. 2, the end is formed of frustoconical portions which permit the easy insertion of the hat upon the rod up to the shoulder 22, but which resists the reverse movement of the hat relative to the support. While this structure is preferred, it is possible to employ a square ended supporting rod 13, or even a round ended rod if the round end is of large enough diameter to prevent removal of the hat C once it is attached.

Figure 5:
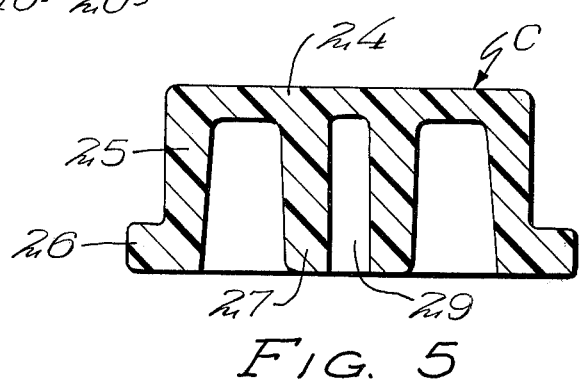
FIG. 5 is a cross sectional view through the hat of the general type shown in FIG. 1.
Figure 6:
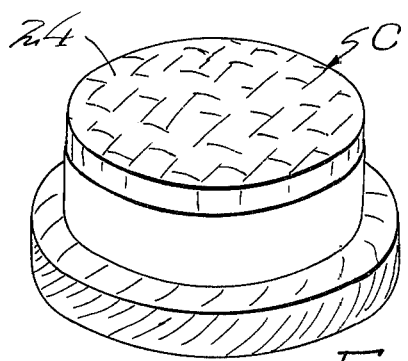
FIG. 6 is a perspective view of the hat shown in FIGS. 1 and 5.
Figure 7:
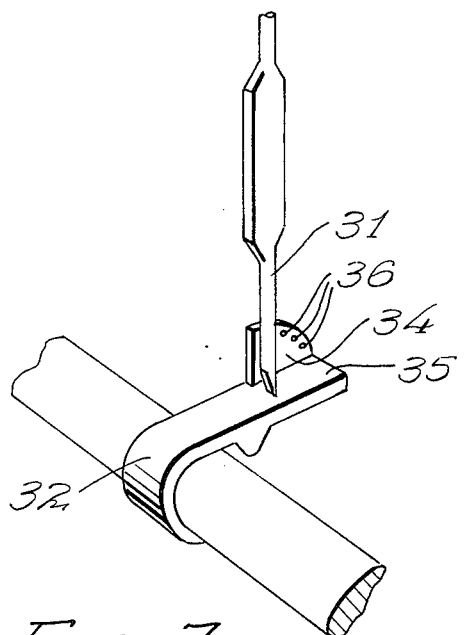
FIG. 7 is a perspective view of a modified form of construction.

A typical plastic foam hat is illustrated in FIGS. 5 and 6 of the drawings, and indicated in general by the letter B. The hat includes a crown portion 24, a riser 25, and a brim 26, although this is somewhat of a matter of choice depending upon the type of hat being used. A tapered boss 27 extends downwardly from the crown 24 of the hat, and it centrally socketed as indicated at 29 to accommodate the end 23 of the supporting rod 13. In the particular construction shown, the hat C is formed of expanded plastic foam and simulates a straw hat or skimmer of the type in general fashion some years ago. The grooves 23 in the rod 13 engage in the socket 29 to hold the hat in place. As has been previously stated, the end of the rod 13 may be square or otherwise formed so that the hat remains in place on the top of the rod 13 even though the vehicle B travels at a considerable rate of speed.

As is indicated in the drawings, the support A may be used either on the top of an automobile or the like, or may be used on te handle bars of a bicycle or motorcycle. The hat C comprises an ornament, and obviously a structure other than a hat could be supported on the support 13.

Figure 8:
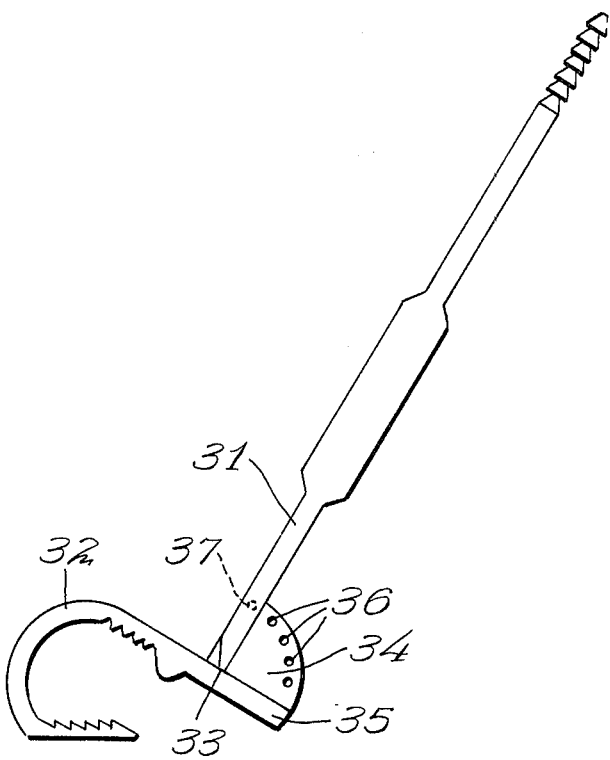
FIG. 8 is a side elevational view of the modified form of construction shown in FIG. 7.
Figure 9:
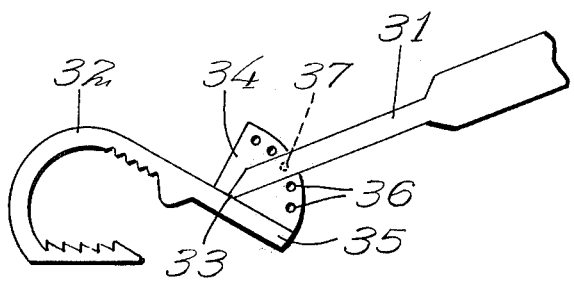
FIG. 9 is a view similar to FIG. 8 showing the rod in adjusted position.
Figure 10:
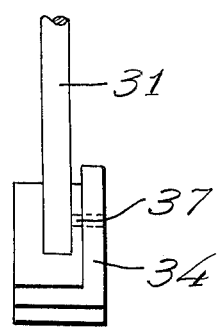
FIG. 10 is an end elevational view of the construction shown in FIG. 9.

The support shown in FIGS. 8, 9 and 10 show a modified form of construction similar to that previously disclosed, but adjustable in position. As indicated in FIGS. 8 and 9, the rod 31 is connected to the bracket 32 across a transverse hinge line 33 so that it can pivot relative to the bracket, and relative to a segment 34 mounted to one side of the rod 31 on the end 35 of the bracket 32. The segment 34 includes a series of adjustment holes or apertures 36. By flexing the rod 31 to the right from the position shown in FIG. 8, and flexing the rod 31 slightly to one side, the pin 37 which extends laterally from the rod 31 may be moved across the segment 34 and engaged in any of the holes 36, adjusting the angularity of the pin relative to the bracket 32.

Figure 12:
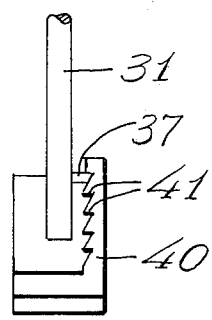
FIG. 12 is a view similar to FIG. 10 showing the structure shown in FIG. 11.
Figure 11:
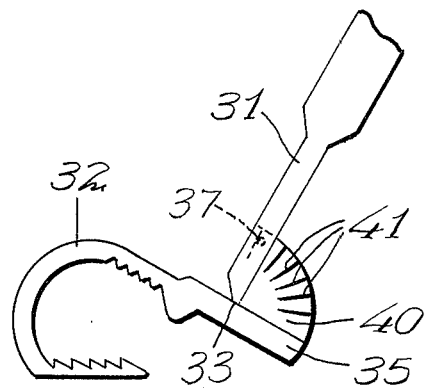
FIG. 11 is a view similar to FIG. 9 showing a second modified form of construction.

FIGS. 11 and 12 show a construction similar to that of FIGS. 7 through 10, and the bracket 32, rod 31, the hinge connection 33 and pin 37 have been given similar identifying numerals. However, in this construction the segment 40, (similar to the segment 34) has been provided with angularly related teeth 41 which are engageable with the pin 37 to hold the rod in an adjusted position relative to the bracket 32. The resilient tendency for the rod to return to its normal position shown in FIG. 11 holds the rod in adjusted position. Obviously, the device is cast or otherwise formed of a somewhat resilient plastic, so that the necessary flexing of the structure shown in FIGS. 7 through 12 may function as described.

In accordance with the Patent Statutes, I have described the principles of construction and operation of my Miniature Hat Supports, and while I have endeavored to set forth the best embodiments, I desire to have it understood that obvious changes may be made within the scope of the following claims without departing from the spirit of my invention.

I claim:

1. An ornament support for use with an automobile having a windshield, a top, and a molding extending along the upper edge of the windshield, the molding having a lower edge adapted to substantially engage the windshield, an upper edge adapted to substantially engage the top of the automobile, the support including:

a resilient bracket including a lower end edge extending beneath the lower edge of said molding, an upper end including a stop shoulder extending over said molding and including a stop shoulder engaging the area between the upper edge of said molding and said top of said automobile, and a resilient rounded connection between the upper and lower ends of said bracket, said bracket supporting a rod extending upwardly from the upper portion thereof, and an ornament supported by the upper end of said rod.

2. The structure of claim 1 and in which said bracket is formed of plastic.

3. The structure of claim 1 and including teeth extending transversely of said bracket on the inner surface thereof to hold said bracket from slipping.

4. The structure of claim 3 and in which said teeth are provided on opposite sides of the rounded connection of said bracket.

5. The structure of claim 1 and in which said rod extends in generally right angular relation to the upper end of said bracket.

6. The structure of claim 1 and in which the end of said rod is grooved to accommodate said ornament.

7. The structure of claim 1 and in which said ornament comprises a miniature hat.

8. The structure of claim 1 and in which said upper arm of said bracket is thicker than the remainder of said J-shaped bracket.

9. The structure of claim 1 and in which said rod is pivotally supported on an axis transverse relative to said upper end of said J-shaped bracket.

10. The structure of claim 9 and including means for holding said arm in a selected pivotal position relative to the upper end of said bracket.

* * * * *